United States Patent [19]
Huitsing

[11] Patent Number: 5,778,951
[45] Date of Patent: Jul. 14, 1998

[54] MOLDING CUTTING DEVICE

[76] Inventor: John A. Huitsing, 7388 Tory, Hudsonville, Mich. 49426

[21] Appl. No.: 840,979

[22] Filed: Apr. 21, 1997

[51] Int. Cl.$^6$ .................................. B27C 5/10; B27M 3/00
[52] U.S. Cl. .................................. 144/144.1; 144/135.3; 144/137; 144/144.51; 144/154.5; 144/372; 409/125; 409/130
[58] Field of Search .......................... 144/134.1, 135.2, 144/144.1, 136.95, 144.51, 145.2, 154.5, 372, 371, 135.3, 137; 409/125, 130, 182

[56] References Cited

U.S. PATENT DOCUMENTS

| 241,241 | 5/1981 | Ruge . |
|---|---|---|
| 787,142 | 4/1905 | Barnett . |
| 1,410,591 | 3/1922 | Norton . |
| 1,612,235 | 12/1926 | Thomas . |
| 1,665,721 | 4/1928 | Stockton . |
| 2,173,700 | 9/1939 | Skarsten . |
| 2,266,457 | 12/1941 | Wolff . |
| 2,487,944 | 11/1949 | Pressman . |
| 2,615,256 | 10/1952 | Olson . |
| 2,725,776 | 12/1955 | Hopkins . |
| 2,741,033 | 4/1956 | Amato et al. . |
| 2,949,674 | 8/1960 | Wexler . |
| 4,356,849 | 11/1982 | Fredrickson . |
| 4,871,002 | 10/1989 | Turner . |
| 4,880,042 | 11/1989 | Schafferkotter . |
| 5,094,279 | 3/1992 | Dickey et al. . |

*Primary Examiner*—W. Donald Bray
*Attorney, Agent, or Firm*—Price, Heneveld, Cooper Dewitt & Litton

[57] ABSTRACT

A device for cutting trim moldings according to their displayed surface designs including a base for securely holding various molding widths, a profile gauge and a clamp for locking the profile gauge in an adjusted position on the base for a selected molding. The edge of the profile gauge functions to guide a cutting device such as a router. In a preferred embodiment, the clamp includes a router plate which is mounted at a predetermined angle relative to the base so the object molding is cut at such angle.

25 Claims, 4 Drawing Sheets

MOLDING CUTTING DEVICE

BACKGROUND OF THE INVENTION

The present invention relates to molding cutting devices and particularly to devices for cutting the edge of moldings according to their unique surface designs.

Trim moldings used in interior finishing can be quite elaborate, having surface designs that enhance the appearance of today's interiors. However, the unique designs of these moldings create a problem when the moldings are mated with each other, as in the corners of rooms particularly if the corner is not perfectly square where a 45° miter cut will allow a mating joint. As a result, various devices have been designed to allow one piece of molding to abut the surface of another piece of molding by cutting the edge of the second piece with, for example, a coping saw such that the contour will match the surface of the first piece such that the molding pieces will mate to give an overall aesthetically pleasing appearance.

Molding cutting devices which are well known in the art are adapted to provide the above-type of cut along the edge of a section molding. Such devices combine a base for holding a section of molding steady and a fixed template which incorporates the unique design of the molding and which is used as a guide during the cutting operation. Typically, a router with a cutter attachment is used to cut the exposed edge of the molding. In these devices, the template incorporates the design of the molding and must be shaped according to each molding design used. Because the user may need to cut a variety of different moldings, the user must obtain and install a separate template for each molding design. Not only is this inconvenient and time consuming but purchasing numerous templates is expensive. In addition, some molding designs may require a specially ordered template, and designs exist for which no templates exist. Also, different millworks will frequently produce the same molding designs but with slightly different tolerances and, therefore, a given template may not be accurate.

As a result, a device was needed that utilized a template accurately in the shape of the object molding which was being cut. In one proposal, a piece of the object molding is cut and clamped within the device to guide the router during the cutting operation. Although this offers an advantage in that it does not require the purchase of a separate template for each molding design, when used, the small piece of molding used as a template is subject to wear and breakage due to the force placed on it by the router bearing during the cutting operation. Combined with the fact that it takes time and effort to utilize this device, and that it is not very durable, there remains a need for a device which incorporates an adjustable router guide capable of sustaining significant strain and which can efficiently and accurately adapt to various types of molding designs.

Furthermore, the device should not only cut the edge of a molding according to the design of the molding, the device should be capable of cutting that design at an appropriate angle to increase the integrity of the mating between the molding sections, e.g., at walls which are not "square" to each other and also accommodate various widths of moldings. Therefore, a molding cutting device is needed which can easily align and retain various widths of object moldings, can adapt to various designs of moldings without using separate templates and allows for cutting the molding at an angle to insure proper mating between molding sections.

SUMMARY OF THE PRESENT INVENTION

The system of the present invention provides a solution to the problems of known types of molding cutting devices. The device includes a base with a series of slots, which allow an adjustable clamping block to be secured to one edge of the base. The adjustable clamping block adapts to various widths of moldings and has a chamfered inside surface which engages and clamps the object molding to a stationary opposite side of the base which extends upwardly the length of the base. The inside surface of this opposite side of the base is chamfered similarly to the inside surface of the adjustable clamping block. These chamfered surfaces engage the opposed lengthwise edges of the object molding and are designed to counter the "up force" generated by the router during the cutting operation.

Upper and lower clamping bars are hinged to one another and are mounted at an angle to the base to clamp a profile/contour gauge to the base. The profile gauge is comprised of a casing containing a series of pins adjacent to one another which extend out either side of the casing and conform to the shape of a molding surface when pressed against the molding. Once clamped, the profile gauge serves as a guide for the router as it cuts across the width of the object molding.

To cut a section of molding according to a particular design, the surface of the molding containing the design is pressed against the pins of the profile gauge, which assume the shape of the molding. Thereafter, with the clamping bars in an open position, the back end of the pins of the gauge are placed between the clamping bars which are then clamped shut to hold the pins of the profile gauge in the desired configuration of the molding. A router plate is mounted to the top surface of the upper clamping bar. With the pins of the profile gauge locked between the upper and lower bars, the user places the bottom surface of a router flush against the router plate so that the cutter of the router extends downwardly beyond the profile gauge. With the router in this position, the bearing of the router rides adjacent the profile gauge so that, as the user moves the router across the width of the end of the molding, the router cuts the object molding according to the profile gage. Such a device thus allows a finish carpenter on a job site to quickly cut different styles of molding without the need to use specialized fixed templates.

These and other features, objects and advantages of the present invention will become apparent upon reading the following description thereof together with reference to the accompanying drawings.

DETAILED DESCRIPTION OF THE PREFERRED EMBODIMENT

Figure 1:
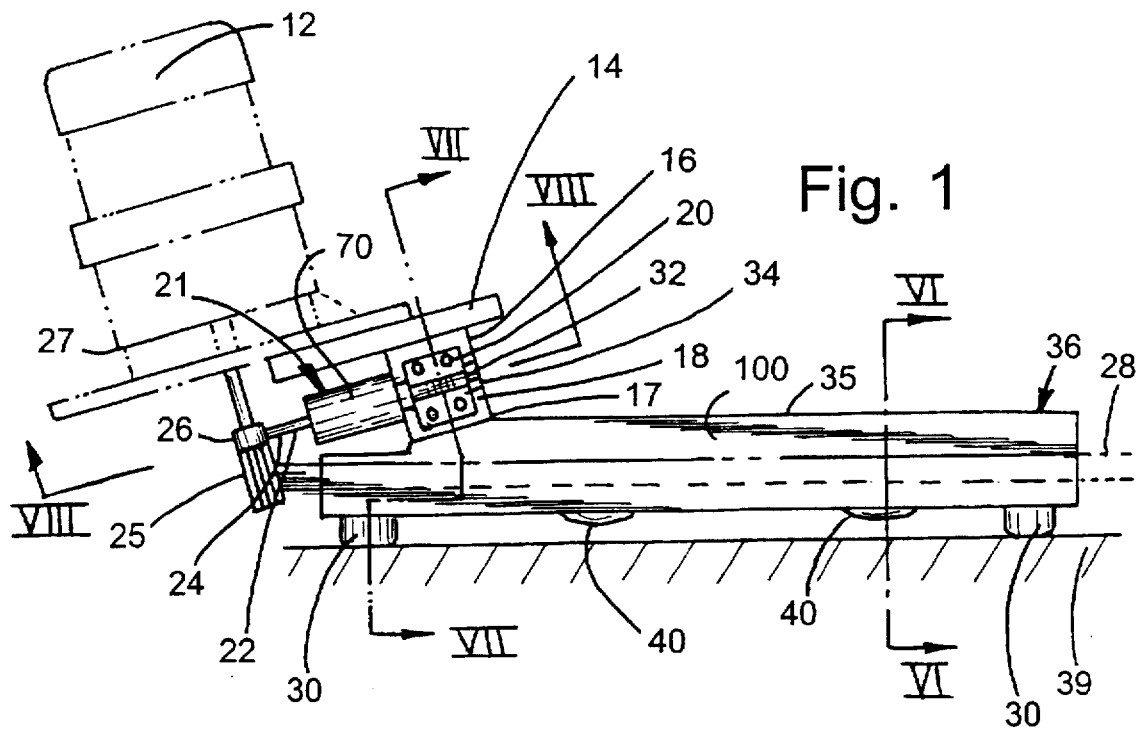
FIG. 1 is a left side elevational view of a molding cutting device.

Referring initially to FIGS. 1–5, there is shown a molding cutting device 10 resting on a work surface such as a table 39. Device 10 has a generally rectangular base 36 with rubber feet 30 to prevent slippage of the device during use.

The base 36 holds object molding in place with respect to a router 12 and can accommodate various widths of molding by an adjustable clamping block 54 defining an adjustable width channel 62 (FIG. 2) passing through the length of base 36. The block houses a tightening means comprised of a series of bolts 40 having threaded ends 64 and corresponding wing nuts 56 to tighten the adjustable clamping block 54 to the base. Block 54 is adjusted laterally by elongated slots 38 (FIG. 4) in base 36 and through which bolts 40 extend. When the sides of the object molding 28 contact both the adjustable clamping block 54 and the stationary side 59 of the base 36, the user tightens the wing nuts 56 on the carriage bolts 40 to lock the adjustable clamping block 54 to the base 36 and thus securing the object molding.

Figure 4:
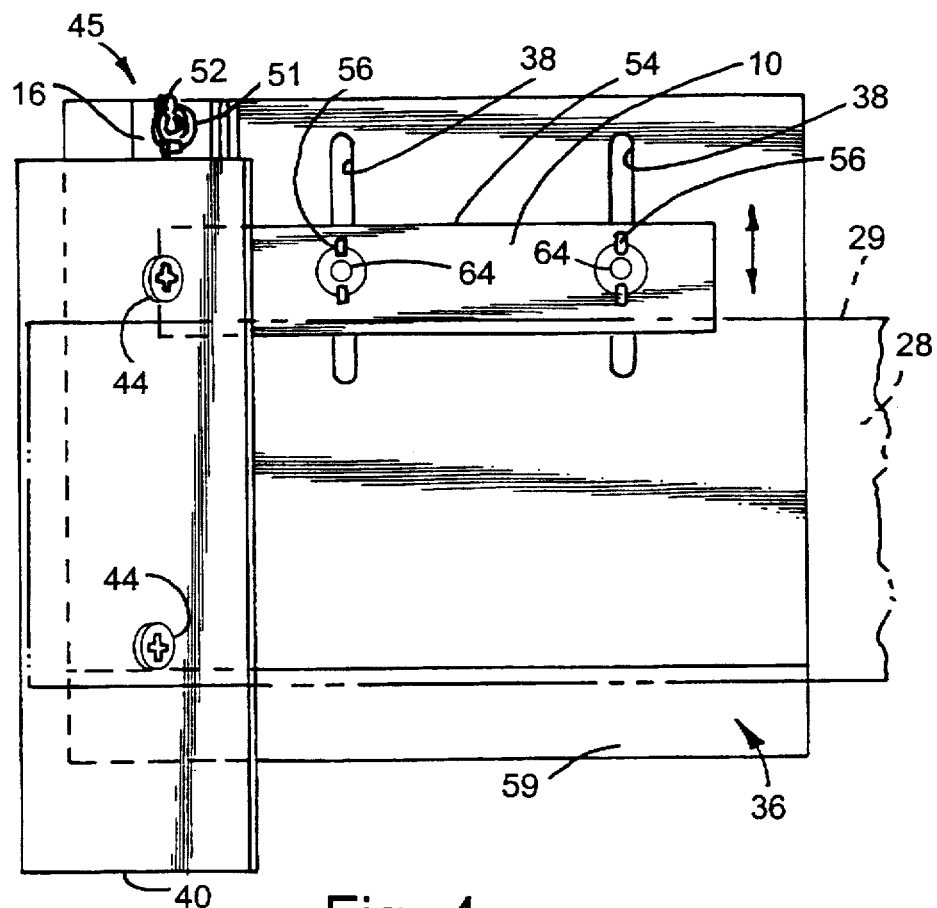
FIG. 4 is a top plan view of the molding cutting device of FIG. 1.
Figure 5:
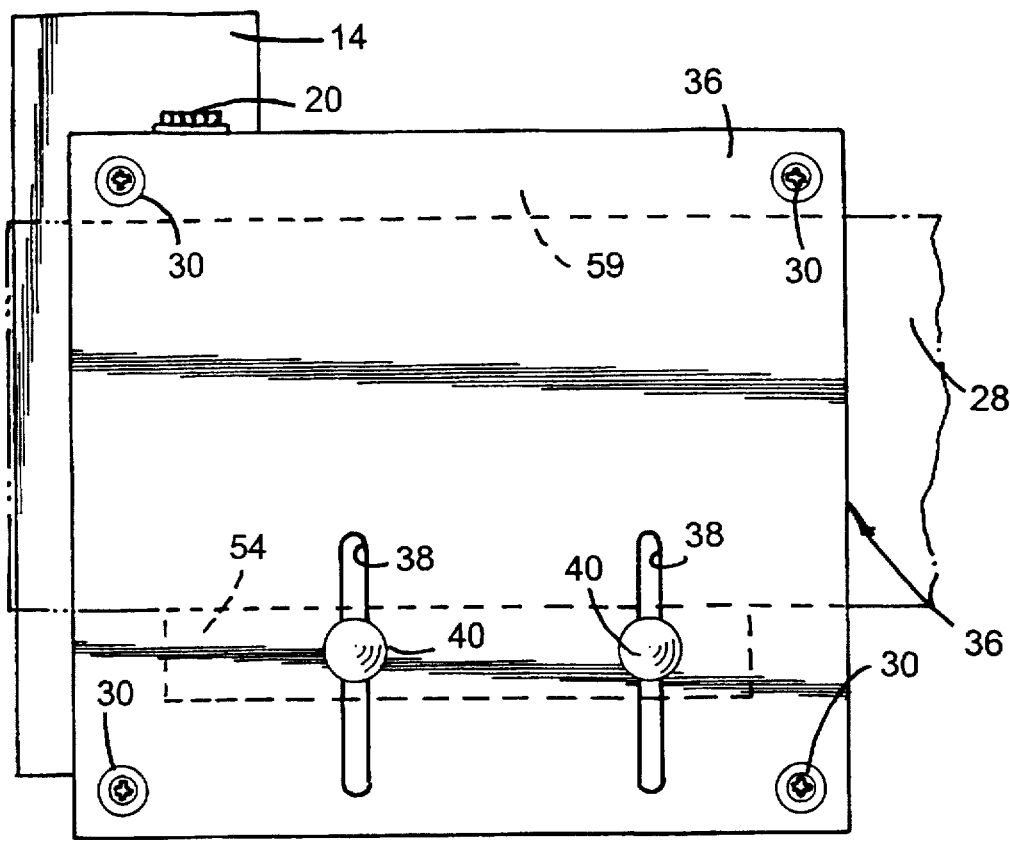
FIG. 5 is a bottom plan view of the molding cutting device of FIG. 1.
Figure 6:
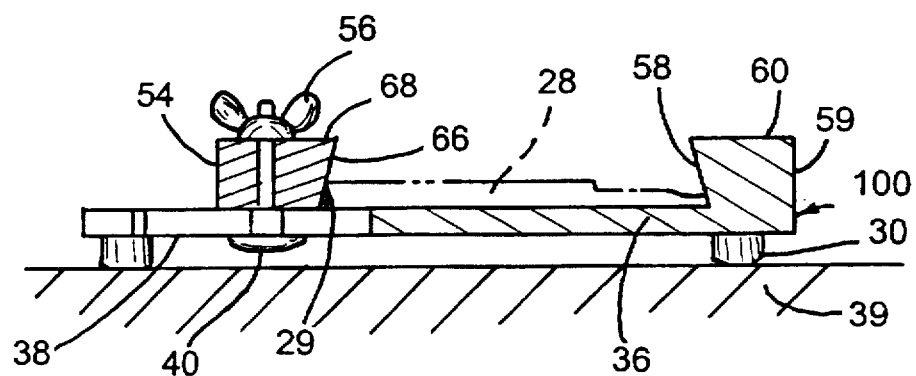
FIG. 6 is a cross-sectional view taken along section line VI—VI of FIG. 1.

The adjustability of the clamping block 54 is best shown in FIGS. 4, 5 and 6. The adjustable clamping block 54 extends longitudinally and moves perpendicular to the series of slots 38 to engage the edge 29 of the object molding 28. In this position, the user can tighten the wing nuts 56 of the carriage bolts 40 to secure the adjustable clamping block 54 to the base 36. The stationary side 59 of the base 36 is the same height as the adjustable clamping block 54 so that a bottom surface 19 of a lower bar 18 lies parallel to the top surface 68 of the adjustable clamping block 54 and the top surface 60 of the stationary side 59 of the base 36. In addition, both the adjustable clamping block and the stationary side 59 of the base 36 have outwardly and downwardly chamfered inside surfaces 66, 58, respectively, to stabilize the object molding 28 during the cutting operation.

With the wing nuts 56 loosened, the user can slide the adjustable clamping block 54 along the series of slots 38 to accommodate the width of the object molding 28 which has an end moved into the cutting area of router 12. When the adjustable clamping block 54 is placed at the appropriate width, the user tightens the wing nuts of the tightening means to secure the block 54 and, the molding 28 so the molding can be readily cut according to the shape of a profile gauge 21. FIG. 5 shows the bottom of the device 10 after the object molding 28 has been clamped into the base 36 of the device 10.

A profile gage clamp is defined by a lower bar 18, which is attached at 17 to the front of and extends across the width of the base. A hinge 20 (FIGS. 1, 2 and 7) couples one end of an upper bar 16 to one end of bar 18. The facing surfaces of upper and lower bars 16 and 18 include rubber pads 32, 34 (FIG. 7), respectively, which, as described below, sandwich the back of and secure pins 22 of a profile gauge 21 positioned in the clamp defined by the upper and lower bars when they are clamped together. The commercially available profile gauge 21 consists of a series of pins 22 held within a casing 70 (FIG. 8) so the pins extend out either side of the casing. When an object is pressed against the pins 22, they slide into the front of casing 70 and out the back of the casing. As a result, the pins 22 conform to the shape of the object, e.g., a section of molding.

A router mounting plate 14 is secured to the top surface of upper bar 16 with fastening means 44, e.g., screws (shown in FIG. 7), and is oriented so the router mounting plate is parallel to the upper and lower bars. When the device is fully assembled, the user can place a router 12 flush against the router mounting plate 14 so the bearing 26 of the router 12 rides along the front end 24 (FIG. 8) of the pins 22 of the profile gauge 21 as the user moves the router across the width of the object molding 28 thus cutting the edge of the object molding with the router cutter 25 according to the shape of the profile gauge.

Figure 3:
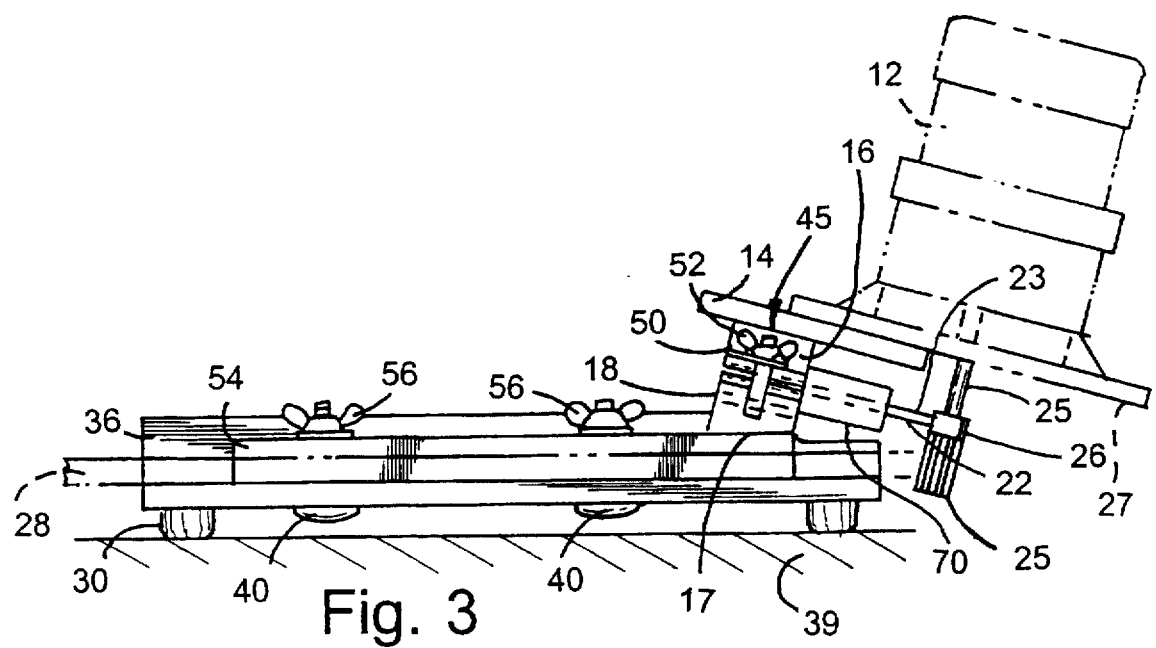
FIG. 3 is a right side elevational view of the molding cutting device of FIG. 1.

As best shown in FIGS. 1 & 3, the lower bar 18 is mounted to the base 36 at a predetermined angle of from about 10°–15° relative to the top 35 of the base 36 so that when the user places the router 12 against the router mounting plate 14 the router undercuts the object molding 28 at an angle to accommodate mating sections of molding. When the user places the router against the router mounting plate, the bottom surface 27 of the router 12 is parallel to the lower bar 18. During the cutting operation, because the object molding 28 lies parallel to the base 36, the cutter 25 of the router 12, which is perpendicular to the bottom surface 27 of the router, cuts the object molding 28 at the same predetermined angle that the lower bar is mounted relative to the base. FIGS. 1 and 3 show the hinged relationship between the upper and lower bars 16, 18, respectively, after the profile gauge 21 has been clamped into place.

Figure 2:
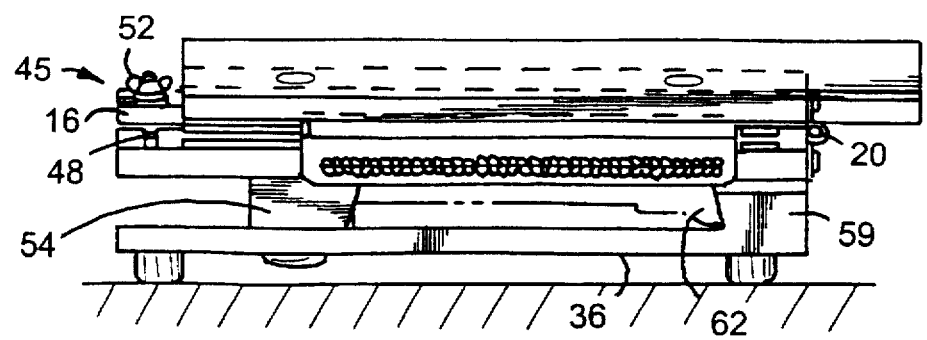
FIG. 2 is a front elevational view of the molding cutting device of FIG. 1.
Figure 7:
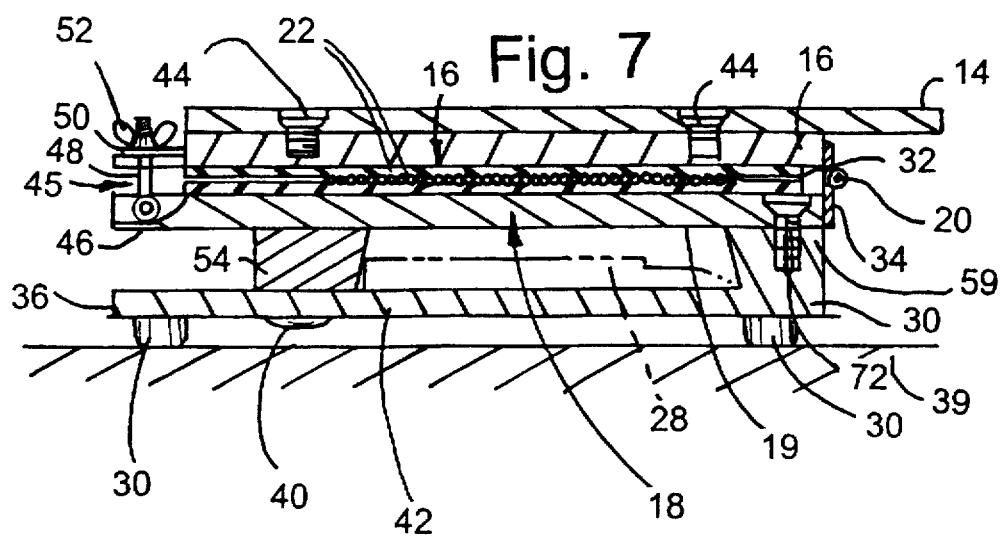
FIG. 7 is a cross-sectional view taken along section line VII—VII of FIG. 1.

As best seen in FIGS. 2–4, the profile clamp has locking mechanism 45 which is used to secure the profile gauge 21 once set with the desired molding design. The locking mechanism 45 squeezes the upper and lower bars, 16, 18, respectively, together while sandwiching the back end 23 (FIG. 8) of the pins 22 of the profile gauge 21. The mating between bars 16, 18 of the apparatus 10 is also shown in detail in FIG. 7. In FIG. 7, the lower bar 18 is fastened with a bolt 72 to the upwardly extending stationary side 59 of the base 36. After the user sets both the adjustable clamping block 54 (FIG. 6) at the width of the object molding 28 as described above, the profile gauge 21 is placed on the lower bar 18 and then the back end 23 of the pins 22 of the profile gauge 21 are set on the rubber mat 34. Thereafter, the upper bar 16 is pivoted to a closed position with rubber mat 32 on top of the back end 23 of the pins 22 of the profile gauge 21. Next, the user clamps the components of the system shut by the locking mechanism 45. Locking mechanism 45 consists of a pin 46 and a bolt 48 having one end adapted to rotate about the pin and the opposite end having threads adapted to receive a wing nut 52. To lock the back end 23 of the pins 22 of the profile gauge 21, the user rotates the locking mechanism 45 clockwise in FIG. 7 until it engages the edges of an open slot 51 in the end of upper bar 16. Thereafter, the user can tighten the wing nut 52 thus providing a downward clamping force between the upper and lower bars 16, 18, respectively, to secure the back end 23 of the pins 22 of the profile gauge 21.

FIG. 2 shows the object molding 28 clamped in position by the adjustable clamping block 54 and the stationary side 59 of the base 36. In addition, the front end 24 of the pins 22 of the profile gauge 21 are shown. With the router placed against the router mounting plate, the user moves the router width-wise so the cutter 25 engages the object molding 28 while the bearing 26 of the router 12 rides along and is guided by the front end 24 of the profile gauge pins 22. The clamp defined by the upper and lower bars 16, 18, respectively, holds the pins 22 of the profile gauge 21 rigid so the bearing 26 of the router 12 maintains steady contact with the front end 24 of the pins 22 of the profile gauge 21 during the cutting operation.

Figure 8:
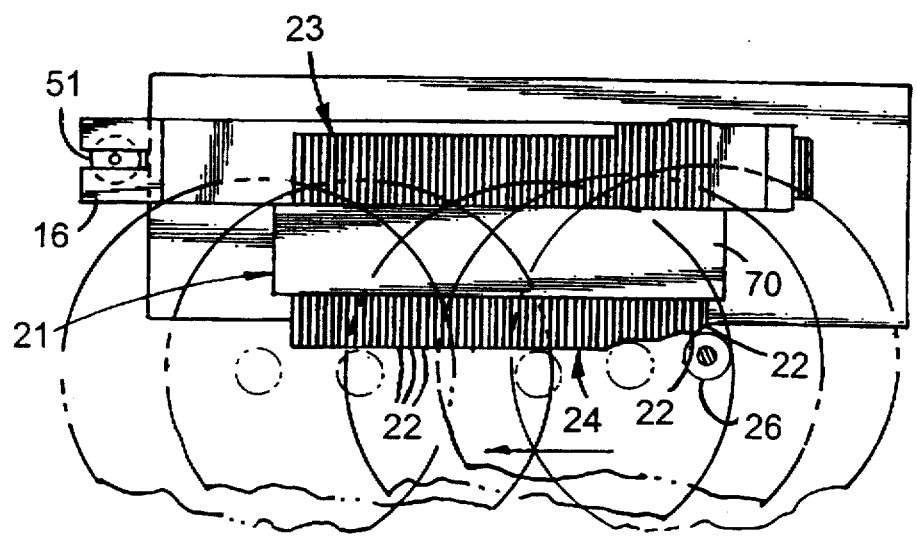
FIG. 8 is a cross-sectional view taken along section line VIII—VIII of FIG. 1, showing the router bearing as it moves along the shape of the profile gauge.

The cutting operation is best shown in FIG. 8. As described above, once the profile gauge 21 has been set, the top bar 18 is rotated about hinge 20, thus sandwiching the back end 23 of the pins 22 of the profile gauge 21. The locking means 45 of the lower bar is rotated upwards (clockwise in FIG. 7) until it engages the edges of slot 51 of the upper bar 16. Thereafter, the user tightens the wing nut 52 of the locking means 45 of the lower bar 18 to secure the back end 23 of the pin 22 of the profile gauge. To cut the object molding 28, the bottom surface 27 of the router 12 is placed flush against the router mounting plate 14 so that the router is at the same predetermined angle as the upper and lower bars, 16, 18, respectively, relative to the top surface of the base 36. As the user brings the cutter 25 of the router into contact with the object molding 28, the bearing 26 of the router 12 abuts the front end 24 of the pins 22 of the profile gauge 21. As the user moves the router across the width of the object molding 28 (right to left in FIG. 8) the bearing 26 rides adjacent to the front end 24 of the pins 22 of the profile gauge 21. As a result, the cutter 25 undercuts the edge of the object molding 28 according to the shape of the preset profile gauge 21. For cuts needed in the opposite direction, the user need only release the locking means 45 of the lower bar 18 and reverse the profile gauge so the back end 23 (FIG. 8) of the profile pins 22 becomes the router guide.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A device for cutting trim moldings comprising:
   a base defining an adjustable width channel for receiving and holding molding;
   a lower bar mounted to said base and extending across said channel;
   an upper bar having one end pivotally coupled to said lower bar;
   a router plate mounted to said upper bar for supporting a router; and
   an adjustable template containing a series of pins movable to conform to the shape of an object pressed thereagainst, said template selectively clamped between said upper and lower bars to define a guide for a router.

2. The apparatus as defined in claim 1 wherein said adjustable template is a profile gauge.

3. The apparatus as defined in claim 1 wherein said base includes a fixed edge for engaging one edge of a piece of molding and a movable clamp for engaging an opposite edge of the molding.

4. The apparatus as defined in claim 3 wherein said fixed edge and said movable clamp have facing chamfered surfaces to hold a piece of molding downwardly on a top surface of said base.

5. The apparatus as defined in claim 4 wherein said base includes at least a pair of parallel spaced slots which extend laterally with respect to said channel of said base for adjusting said clamp.

6. The apparatus as defined in claim 5 wherein said clamp includes fasteners for tightening said clamp to said base at the width of molding to be cut.

7. The apparatus as defined in claim 6 wherein said base includes feet to prevent slippage of said base when positioned on a work surface.

8. The apparatus as defined in claim 1 wherein said router plate and said upper and lower bars are secured at a predetermined angle with respect to said top surface of said base.

9. The apparatus as defined in claim 1 wherein said upper and lower bars include facing pads for frictionally engaging said adjustable template.

10. The apparatus as defined in claim 1 and further including a locking mechanism for releasably locking said upper and lower bars together.

11. The apparatus as defined in claim 10 wherein said locking mechanism includes a bolt pivotally mounted to one end of one of said bars and a slot formed in one end of the other of said bars.

12. A device for cutting trim moldings comprising:
    a base for securing a section of molding;
    an adjustable mold cutting template; and
    a clamp for fixing said template to said base, said template having the shape of molding to be cut.

13. The apparatus as defined in claim 12 wherein said adjustable template comprises a profile gauge.

14. The apparatus as defined in claim 12 wherein said base defines an adjustable width channel for holding molding of different widths in place on said base.

15. The apparatus as defined in claim 12 and further including a router plate mounted at a predetermined angle to said base.

16. The apparatus as defined in claim 12 wherein said adjustable template is a profile gauge and said clamp includes facing frictional surfaces to engage and lock pins of said profile gauge in place.

17. The apparatus as defined in claim 16 wherein said clamp comprises a pair of bars extending across an end of said base and wherein one of said bars is pivotally mounted to the other of said bars to open and close said clamp.

18. The apparatus as defined in claim 17 wherein said bars include a hinge pivotally coupling one end of each of said bars to each other.

19. The apparatus as defined in claim 18 wherein an opposite end of said bars includes a releasable lock for holding said bars in a closed clamping position.

20. A device for cutting trim moldings comprising:
    a base including a fixed edge for engaging one edge of a piece of molding and a movable edge for engaging an opposite edge of the molding, for receiving and holding molding of different widths; and
    a clamp for releasably locking a profile gauge in fixed relationship to said base such that a router can be guided by an edge of said profile gauges for cutting molding held by said base.

21. The apparatus as defined in claim 20 wherein said fixed edge and said movable edge have facing chamfered surfaces to hold a piece of molding downwardly on a top surface of said base.

22. The apparatus as defined in claim 21 and further including a router plate fastened to said clamp at a predetermined angle with respect to said top surface of said base.

23. The apparatus as defined in claim 22 wherein said clamp comprises upper and lower bars which include facing pads for frictionally engaging pins of said profile gauge.

24. The apparatus as defined in claim 23 and further including a locking mechanism for releasably locking said upper and lower bars together.

25. The apparatus as defined in claim 24 wherein said locking mechanism includes a bolt entered into a slot in one of said bars and pivotally mounted to the other of said bars.

* * * * *